United States Patent
Srivastava et al.

(10) Patent No.: US 9,321,959 B2
(45) Date of Patent: Apr. 26, 2016

(54) PROCESS OF FORMING PHOSPHOR PARTICLES WITH CORE SHELL STRUCTURES

(71) Applicant: General Electric Company, Schenectady, NY (US)

(72) Inventors: Alok Mani Srivastava, Niskayuna, NY (US); Holly Ann Comanzo, Niskayuna, NY (US); William Winder Beers, Chesterland, OH (US); Samuel Joseph Camardello, Albany, NY (US); Digamber Gurudas Porob, Karnataka (IN); William Erwin Cohen, Solon, OH (US)

(73) Assignee: GENERAL ELECTRIC COMAPNY, Schenectady, NY (US)

( * ) Notice: Subject to any disclaimer, the term of this patent is extended or adjusted under 35 U.S.C. 154(b) by 55 days.

(21) Appl. No.: 14/467,087

(22) Filed: Aug. 25, 2014

(65) Prior Publication Data

US 2016/0053171 A1 Feb. 25, 2016

(51) Int. Cl.
 - *C09K 11/00* (2006.01)
 - *C09K 11/77* (2006.01)
 - *C09K 11/08* (2006.01)

(52) U.S. Cl.
 CPC ......... *C09K 11/7777* (2013.01); *C09K 11/0861* (2013.01)

(58) Field of Classification Search
 CPC .................. C09K 11/0861; C09K 11/7777
 See application file for complete search history.

(56) References Cited

U.S. PATENT DOCUMENTS

| | | | |
|---|---|---|---|
| 5,651,920 | A | 7/1997 | Chau et al. |
| 2008/0095685 | A1 | 4/2008 | Psaras et al. |
| 2010/0051868 | A1 | 3/2010 | Le-Mercier et al. |
| 2011/0311823 | A1 | 12/2011 | Porob et al. |
| 2012/0025137 | A1* | 2/2012 | Buisette ............ C01B 25/37 252/301.4 P |
| 2012/0049117 | A1 | 3/2012 | Buissette et al. |
| 2012/0241672 | A1 | 9/2012 | Buissette et al. |

FOREIGN PATENT DOCUMENTS

| | | |
|---|---|---|
| CN | 101368101 B | 2/2009 |
| EP | 1473347 A1 | 11/2004 |

OTHER PUBLICATIONS

Buissettea et al., "Highly Luminescent Composite Films from Core-Shell Oxide Nanocrystals", MRS Proceedings, vol. 846, 2004.
Buissette et al., "Luminescent Core/Shell Nanoparticles with a Rhabdophane LnPO4—xH2O Structure: Stabilization of Ce3+-Doped Compositions", Advanced Functional Materials, vol. 16, Issue 3, pp. 351-355, Feb. 2006.
Li et al., "Synthesis and Luminescence of CePO4:Tb/LaPO4 Core/sheath Nanowires", Nanotechnology, vol. 21 Issue 12, 2010.
European Search Report and Opinion issued in connection with corresponding EP Application No. 15179099.5 on Jan. 20, 2016.

* cited by examiner

*Primary Examiner* — Robert Vetere
(74) *Attorney, Agent, or Firm* — GE Global Patent Operation; Peter T. DiMauro

(57) ABSTRACT

Processes for producing particles of rare earth-containing phosphor materials, in which the particles have a core-shell structure and the shell has a lower rare earth content than the core. Such a process may include contacting a core particle with a precursor comprising $Na(La,Ce,Tb)P_2O_7$ to form a mixture, and then heating the mixture to a temperature sufficient to decompose the $Na(La,Ce,Tb)P_2O_7$ to evolve and melt an $NaPO_3$ flux and initiate deposition of a $(La,Ce,Tb)PO_4$ shell on each core particle in the presence of the molten $NaPO_3$ flux.

19 Claims, 1 Drawing Sheet

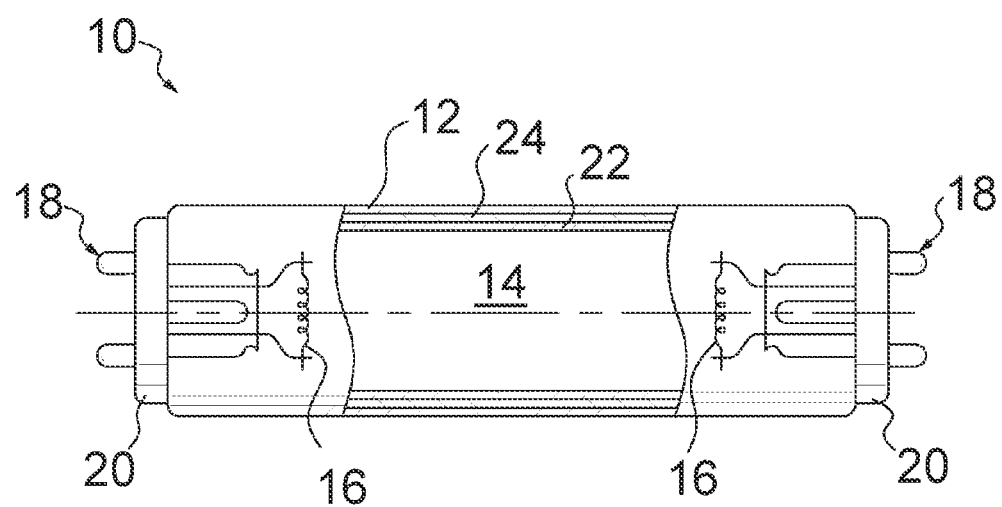

PROCESS OF FORMING PHOSPHOR PARTICLES WITH CORE SHELL STRUCTURES

BACKGROUND OF THE INVENTION

The present invention generally relates to phosphor materials. More particularly, this invention relates to processes for producing rare earth-containing phosphor materials in the form of particles having a core-shell structure, wherein the shell has a lower rare earth metal content than the core.

Phosphors exhibit luminescence and are commonly used in fluorescent lamps, light emitting diodes (LEDs), and various other applications. Phosphor compositions typically comprise a host material doped with an activator that prolongs the emission time. A wide variety of phosphor compositions are known, including rare earth compounds and transition metal compounds doped with one or more rare earth activators.

Fluorescent lamps typically comprise a glass tube that serves as a transparent glass envelope enclosing a sealed discharge space that contains an inert gas and mercury vapor. The inner surface of the glass tube is coated with a layer containing a phosphor composition that is separated from the tube by an ultraviolet (UV) reflecting barrier layer of, for example, alumina or a halophosphor. The mercury vapor is ionized through the application of a current to produce radiation having primarily ultraviolet (UV) wavelengths, which in turn is absorbed by the phosphor composition, resulting in excitation of the phosphor composition to produce visible light that is emitted through the glass tube.

The spectral composition of a light source is typically gauged by its color rendering index (CRI), which is a measure of the degree to which the psycho-physical colors of objects illuminated by a light source conform to those of a reference illuminant under specified conditions. The color-rendering properties and emission output of fluorescent lamps can be improved through the use of phosphor layers containing a mixture of red, green and blue-emitting phosphors, which in combination produce illumination of that appears to be white. As a non-limiting example, phosphor layers have been employed that contain a controlled mixture of europium-activated barium magnesium aluminate phosphor ($BaMgAl_{10}O_{17}:Eu^{2+}$; BAM) as a blue-emitting phosphor, cerium- and terbium-coactivated lanthanum phosphate phosphor ($LaPO_4:Ce^{3+},Tb^{3+}$; LAP) as a green-emitting phosphor, and europium-activated yttrium oxide phosphor ($Y_2O_3:Eu^{3+}$; YOE) as a red-emitting phosphor, mixed in appropriate ratios. As known in the art, the term Aactivated@ refers to the effect that doping with europium, cerium, terbium, and other dopants have with respect to the luminescence of a phosphor.

Terbium is currently used in all high-performance green phosphors, for example, $(La,Ce,Tb)PO_4:Ce^{3+},Tb^{3+}$ (LAP), $(Ce,Tb)MgAl_{11}O_{19}:Ce^{3+},Tb^{3+}$ (CAT), and $GdMgB_5O_{10}:Ce^{3+},Tb^{3+}$ (CBT). However, rare earth elements, and particularly terbium and europium, are relatively expensive metals and their prices impact the cost of phosphor compositions. As such, terbium currently is a significant impact on the cost of green phosphor compositions, and it would be desirable to minimize the cost impact that terbium and potentially other rare earth metals have on green phosphors and lighting systems that employ them.

BRIEF DESCRIPTION OF THE INVENTION

The present invention provides processes for producing particles of rare earth-containing phosphor materials, in which the particles have a core-shell structure and the shell has a lower rare earth content than the core.

According to a first aspect of the invention, a process is provided for producing a phosphor particle that comprises a core surrounded by a shell that absorbs ultraviolet photons to emit green-spectrum light. The process includes contacting a core particle with a precursor comprising $Na(La,Ce,Tb)P_2O_7$ to form a mixture, and then heating the mixture to a temperature sufficient to decompose the $Na(La,Ce,Tb)P_2O_7$ to evolve and melt an $NaPO_3$ flux and initiate deposition of a $(La,Ce,Tb)PO_4$ shell on each core particle in the presence of the molten $NaPO_3$ flux.

According to a second aspect of the invention, a process is provided for fabricating a fluorescent lamp. The process includes forming phosphor particles to each comprise a core surrounded by a shell that absorbs ultraviolet photons to emit green-spectrum light. The forming step comprises contacting a core particle with a precursor comprising $Na(La,Ce,Tb)P_2O_7$ to form a mixture, and then heating the mixture to a temperature sufficient to decompose the $Na(La,Ce,Tb)P_2O_7$ to evolve and melt an $NaPO_3$ flux and initiate deposition of a $(La,Ce,Tb)PO_4$ shell on each core particle in the presence of the molten $NaPO_3$ flux. Thereafter, the phosphor particles are deposited on an inner surface of a glass envelope.

A technical effect of the invention is the ability to produce rare earth-activated phosphor particles that contain relatively low amounts of rare earth metal ions, for example, terbium, by limiting the rare earth content of the material to an outer shell of a particle, such that an interior core of the particle is formed by a mineral material that does not contain any intentional additions of rare earth metals.

Other aspects and advantages of this invention will be better appreciated from the following detailed description.

BRIEF DESCRIPTION OF THE DRAWINGS

FIG. 1 represents a fluorescent lamp, a fragmentary cross-sectional view of a glass tube of the lamp, and an inner surface of the tube provided with a layer containing a phosphor material.

DETAILED DESCRIPTION OF THE INVENTION

FIG. 1 schematically represents a fluorescent lamp 10 of a type known in the art. The lamp 10 includes an elongate glass envelope 12, for example, formed of a soda-lime silicate glass, that in combination with a pair of bases 20 defines, encloses and seals a discharge space 14 of the lamp 10. The discharge space 14 contains a gas mixture having at least one constituent that can be ionized to generate radiation that includes ultraviolet (UV) wavelengths. According to the current state of the art, such a gas mixture would include a discharge-sustaining fill, typically one or more inert gases (for example, argon) or a mixture of one or more inert gases and other gases at a low pressure, along with a small quantity of mercury vapor. A spaced pair of electrodes 16 are electrically connected to electrical contacts 18 extending from the bases 20 at opposite ends of the glass envelope 12. A phosphor material is present at an inner surface of the glass envelope 12 to define a phosphor layer 22 facing the discharge space 14 of the lamp 10. As known in the art, application of a suitable current to the electrodes 16 results in ionization of the mercury vapor and the generation of radiation having primarily UV wavelengths. Photons of the UV radiation are absorbed by the phosphor composition of the phosphor layer 22, resulting in excitation of the phosphor composition to produce visible light that is emitted through the glass envelope 12.

In the nonlimiting embodiment represented in FIG. 1, a barrier layer 24 is represented as being between the phosphor layer 22 and the inner surface of the glass envelope 12. The barrier layer 24 can contain a phosphor material, for example, a conventional calcium halophosphate phosphor, and/or a (UV-reflecting material of a type known in the art, for example, a mixture of alpha- and gamma-alumina particles. The inclusion of alternative or additional layers is also foreseeable and within the scope of the invention.

According to a preferred aspect of the invention, the phosphor layer 22 is formed with the use of particles, of which at least some contain a rare earth-activated (doped) phosphor composition, $LnPO_4$, wherein Ln refers to the lanthanide rare earth metals (Group IIIB of the Periodic Table), of which lanthanum, cerium, and/or terbium are preferred, and may be identified herein as $(La,Ce,Tb)PO_4$. Preferred rare earth-activated phosphor compositions include $LnPO_4$ doped with at least terbium ions ($LnPO_4$:Tb) and more preferably $LnPO_4$ doped with at least cerium and terbium ions ($LnPO_4$:Ce,Tb). All of these rare earth-activated phosphor compositions are collectively referred to herein as LAP phosphor compositions.

LAP phosphor compositions absorb ultraviolet photons (254 nm wavelength) to emit green-spectrum light. To produce with the lamp 10 what visually appears as light of other colors, the phosphor layer 22 preferably contains particles of at least one $LnPO_4$ phosphor composition as well as particles of other phosphor compositions. As a particular but nonlimiting example, the phosphor layer 22 may further contain a blue-emitting phosphor such as europium-activated barium magnesium aluminate phosphor ($BaMgAl_{10}O_{17}$:$Eu^{2+}$; BAM) and a red-emitting phosphor such as europium-activated yttrium oxide phosphor ($Y_2O_3$:$Eu^{3+}$; YOE). The green-, blue- and red-emitting phosphors can be present in appropriate ratios within the phosphor layer 22 to generate what would be considered as white light. Other potential red-emitting phosphor that could be used in combination with Tb-doped $LnPO_4$ phosphor compositions used in the invention include, but are not limited to, europium-activated yttrium vanadate-phosphate (Y(P,V)$O_4$:Eu) and cerium- and manganese-coactivated gadolinium (CBM). Other potential blue-emitting phosphor compositions that could be used in combination with Tb-doped $LnPO_4$ phosphor compositions used in the invention include, but are not limited to, europium-doped halophosphate (SECA) and europium-doped barium magnesium aluminate (BAM).

According to a preferred aspect of the invention, particles of the rare earth-activated phosphor composition used in the phosphor layer 22 are not entirely formed of rare earth-doped $LnPO_4$. Instead, the particles comprise a core surrounded by a shell, and the rare earth-doped $LnPO_4$ phosphor composition is preferentially located in the shell. The shell may consist entirely of a rare earth-doped $LnPO_4$ phosphor composition, though it is foreseeable that the rare earth-doped $LnPO_4$ phosphor composition could be one of multiple constituents of the shell. The core may be formed of one or more mineral materials that are chemically compatible with the rare earth-doped $LnPO_4$ phosphor composition of the shell, but does not contain any intentional additions of rare earth metal and preferably does not contain any rare earth metal beyond any potential impurity levels.

In use within, for example, the lamp 10 of FIG. 1, only a thin surface portion of each particle of the rare earth-activated phosphor composition is sufficiently excited to generate light. As such, activator ions, including but not limited to terbium, cerium and/or lanthanum ions, that are located deep within a particle would not generate light since they are not efficiently excited. Consequently, activator ions are preferably present in the particles to a depth roughly corresponding to the thin surface portion (shell) that can be excited by the UV wavelengths generated by the lamp 10, with the core constituting the balance of each particle, such that that the rare earth metal content of a particle is drastically lower in comparison to a particle formed entirely of the same rare earth-doped $LnPO_4$ phosphor composition present in the shell.

To minimize the cost of the rare earth-activated phosphor composition, the core can be formed of one or more relatively inexpensive compositions, including compositions that contain relatively inexpensive rare earth metals. Notable but nonlimiting examples include $LaPO_4$, $Al_2O_3$, $Y_2O_3$, and $Gd_2O_3$. Each of these compounds are notable for being chemically compatible (e.g., nonreactive) and physically compatible (e.g., sufficiently similar CTEs) with the rare earth-doped $LnPO_4$ phosphor composition present within the shell. These core materials are also compatible with processes described below that are capable of forming a rare earth-containing shell on the core surface.

Synthesis processes for forming particles comprising rare earth-containing shells on rare earth-free cores preferably utilize preformed cores and a precursor of the rare earth-doped $LnPO_4$ phosphor composition, from which the desired rare earth-containing shells deposit and form around the cores to yield a core-shell structure that contains $(La,Ce,Tb)PO_4$ in its shell. In a particular example, a $(La,Ce,Tb)PO_4$ shell is deposited on a core using a precursor material, $Na(La,Ce,Tb)P_2O_7$, that thermally decomposes at an elevated temperature. At temperatures greater than about 800° C., the $Na(La,Ce,Tb)P_2O_7$ precursor decomposes into $(La,Ce,Tb)PO_4$ and $NaPO_3$. As such, the $Na(La,Ce,Tb)P_2O_7$ precursor can be decomposed at relatively low temperatures, for example, below 900° C., to produce a $(La,Ce,Tb)PO_4$ shell. The $Na(La,Ce,Tb)P_2O_7$ precursor is not reactive with core materials such as $LnPO_4$, $Al_2O_3$, $Y_2O_3$, $Gd_2O_3$ or potentially other core materials at temperatures greater than about 800° C. Furthermore, the $NaPO_3$ decomposition byproduct serves as a flux material that melts at or near 627° C. $NaPO_3$ is water soluble, and therefore can be removed by water-washing the resulting rare earth-activated phosphor composition.

Although there are various techniques by which the $Na(La,Ce,Tb)P_2O_7$ precursor can be applied to the surface of a core to produce a $(La,Ce,Tb)PO_4$ shell, a preferred approach is to introduce particles of the desire core material into a solution of the $Na(La,Ce,Tb)P_2O_7$ precursor. As a nonlimiting example, raw materials (such as $LaPO_4$) can be processed to produce a powder whose particles (cores) are preferably micron-sized. The core particles may have regular or irregular geometries, and may be of various shapes, including spherical, elliptical, and/or cubical. The powder is then dispersed in the $Na(La,Ce,Tb)P_2O_7$ precursor by any suitable mechanical method, including but not limited to stirring or blending in a high-speed blender or a ribbon blender. As noted above, because the precursor decomposes to produce $NaPO_3$, the invention does not require the separate addition of a flux material into the mixture, though it is foreseeable that a separate flux material could be added. The mixture can be heated to a temperature above about 800° C. to decompose the precursor, evolve and melt the $NaPO_3$ flux, and initiate deposition of a $(La,Ce,Tb)PO_4$ shell on each particle (core) in the presence of the molten $NaPO_3$ flux. The $(La,Ce,Tb)PO_4$ shell may epitaxially deposit on the particles.

This process can be performed in a reducing atmosphere or otherwise in the presence of a reducing agent, for example, hydrogen, carbon monoxide, nitrogen, charcoal, or combinations thereof. The reducing agent may be diluted with nitrogen, an inert gas (for example, argon), or combinations thereof. Furthermore, the heating (firing) process may be conducted in a material that is effectively inert to the shell and core materials, for example, an alumina crucible. The firing time will depend on the quantity of the mixture to be fired, the rate of gas conducted through the firing equipment, and the quality of the gas-solid contact in the firing equipment. Once the shell has formed, the $NaPO_3$ flux can be removed by washing with hot water, followed by a drying operation to yield the desired rare earth-containing phosphor material whose rare earth metal content is preferably entirely or at least predominantly located in the shells of the particles, and the whose core is preferably free of any intentional additions of rare earth metal. In a particular embodiment, such a particle contains at least terbium in its shell as an activator (dopant), and the underlying core is essentially free of terbium. As further particular examples, the shells may contain or consist of $LnPO_4$:Tb and/or $LnPO_4$:Ce,Tb.

A phosphor layer (for example, the layer 22 represented in FIG. 1) containing the rare earth-activated phosphor composition particles described above can be formed by various known procedures, including but not limited to deposition from liquid coatings and electrostatic deposition. As such, the manner of coating deposition is not a limiting factor of the invention. As particular but nonlimiting examples, the phosphor material can be deposited on the inner surface of the glass envelope 12 from an otherwise conventional aqueous coating solution that contains various organic binders, adhesion-promoting agents, and non-luminescent additives including alumina, calcium phosphate, thickeners, dispersing agents, surfactants, and certain borate compounds.

In a coating process that combines the green-emitting rare earth-activated phosphor composition particles with red- and/or blue-emitting particles, powders of the chosen particles can be blended by weight and then dispersed in an aqueous coating solution, optionally along with any desired additives such as of the types noted above. The resulting dispersion may be diluted with deionized water until suitable for producing a uniform coating based on a targeted coating thickness or weight. The dispersion can then be applied to the inner surface of the glass envelope, for example, by pouring the dispersion downward into the glass envelope or pumping the dispersion upward into the glass envelope while the envelope is held vertically. The resulting coating may be heated and dried by forced air, after which this process can be repeated any number of times to build up a total or cumulative coating thickness that is sufficient to absorb substantially all of the UV light produced by the lamp. Nonlimiting examples include thicknesses for the phosphor layer 22 of about three to about seven particles thick, corresponding to a thickness of about 3 and about 50 micrometers, more preferably about 10 and 30 micrometers, depending on the compositions and particle sizes of the phosphors.

While the invention has been described in terms of specific embodiments, it is apparent that other forms could be adopted by one skilled in the art. For example, the teachings of the present invention could be applied to a variety of fluorescent lamps, including compact fluorescent lamps (CFLs). Therefore, the scope of the invention is to be limited only by the following claims.

The invention claimed is:

1. A process of producing a phosphor particle that comprises a core surrounded by a shell that absorbs ultraviolet photons to emit green-spectrum light, the process comprising:
    contacting a core particle with a precursor comprising $Na(La,Ce,Tb)P_2O_7$ to form a mixture; and
    heating the mixture to a temperature sufficient to decompose the $Na(La,Ce,Tb)P_2O_7$ to evolve and melt an $NaPO_3$ flux and initiate deposition of a $(La,Ce,Tb)PO_4$ shell on each core particle in the presence of the molten $NaPO_3$ flux.

2. The process according to claim 1, wherein the process does not comprise an addition of a separate flux material into the mixture.

3. The process according to claim 1, wherein the precursor consists of $Na(La,Ce,Tb)P_2O_7$.

4. The process according to claim 1, wherein the shell contains at least one of $LnPO_4$:Tb and $LnPO_4$:Ce,Tb.

5. The process according to claim 1, wherein the shell consists of $LnPO_4$:Tb and/or $LnPO_4$:Ce,Tb.

6. The process according to claim 5, wherein Ln is chosen from the group consisting of cerium, terbium, lanthanum, and combinations thereof.

7. The process according to claim 1, wherein the core particle contains at least one of $LaPO_4$, $Al_2O_3$, $Y_2O_3$, and $Gd_2O_3$.

8. The process according to claim 1, wherein the core particle consists of $LaPO_4$, $Al_2O_3$, $Y_2O_3$, or $Gd_2O_3$.

9. The process according to claim 1, wherein the core particle does not contain intentional additions of a rare earth metal.

10. The process according to claim 1, wherein the mixture is heated to a temperature above 800° C. to decompose the $Na(La,Ce,Tb)P_2O_7$.

11. The process according to claim 1, wherein the mixture is heated to a temperature above 800° C. to about 900° C. to decompose the $Na(La,Ce,Tb)P_2O_7$.

12. The process according to claim 1, the process further comprising depositing the phosphor particle on a surface of a glass tube of a fluorescent lamp and the phosphor particle is a constituent of a phosphor layer on the surface.

13. A process of fabricating a fluorescent lamp, the process comprising:
    forming phosphor particles each comprising a core surrounded by a shell that absorbs ultraviolet photons to emit green-spectrum light, the forming step comprising contacting a core particle with a precursor comprising $Na(La,Ce,Tb)P_2O_7$ to form a mixture, and then heating the mixture to a temperature sufficient to decompose the $Na(La,Ce,Tb)P_2O_7$ to evolve and melt an $NaPO_3$ flux and initiate deposition of a $(La,Ce,Tb)PO_4$ shell on each core particle in the presence of the molten $NaPO_3$ flux; and then
    depositing the phosphor particles on an inner surface of a glass envelope.

14. The process according to claim 13, wherein the precursor consists of $Na(La,Ce,Tb)P_2O_7$.

15. The process according to claim 13, wherein the shell contains at least one of $LnPO_4$:Tb and $LnPO_4$:Ce,Tb.

16. The process according to claim 15, wherein Ln is chosen from the group consisting of cerium, terbium, lanthanum, and combinations thereof.

17. The process according to claim 13, wherein the core particle contains at least one of $LaPO_4$, $Al_2O_3$, $Y_2O_3$, and $Gd_2O_3$.

18. The process according to claim 13, wherein the core particle does not contain intentional additions of a rare earth metal.

19. The process according to claim 13, wherein the mixture is heated to a temperature above 800° C. to about 900° C. to decompose the Na(La,Ce,Tb)P$_2$O$_7$.

* * * * *